(12) United States Patent
Lee

(10) Patent No.: US 7,699,516 B1
(45) Date of Patent: Apr. 20, 2010

(54) BACK LIGHT MODULE WITH MICRO FRESNEL LENS

(75) Inventor: Wai-Hon Lee, Los Altos, CA (US)

(73) Assignee: Finity Labs, Mountain View, CA (US)

( * ) Notice: Subject to any disclaimer, the term of this patent is extended or adjusted under 35 U.S.C. 154(b) by 57 days.

(21) Appl. No.: 12/035,276

(22) Filed: Feb. 21, 2008

(51) Int. Cl.
*F21V 7/04* (2006.01)

(52) U.S. Cl. .............. 362/606; 362/600; 362/610; 362/615; 362/619; 362/620

(58) Field of Classification Search ............ 362/600, 362/606, 608, 610, 612, 613, 615, 609, 618, 362/621, 622, 627, 619, 920; 349/58, 60, 349/65, 67, 70
See application file for complete search history.

(56) References Cited

U.S. PATENT DOCUMENTS

| | | | | |
|---|---|---|---|---|
| 5,671,994 A | * | 9/1997 | Tai et al. ............. | 362/603 |
| 7,316,498 B2 | * | 1/2008 | Olczak ............. | 362/607 |
| 7,507,012 B2 | * | 3/2009 | Aylward et al. ........ | 362/625 |
| 2007/0041215 A1 | * | 2/2007 | Kao et al. ............. | 362/620 |

* cited by examiner

*Primary Examiner*—Jacob Y Choi
(74) *Attorney, Agent, or Firm*—Townsend and Townsend and Crew, LLP

(57) ABSTRACT

A back light module where one of the top and bottom surfaces of the light guide contain a micro Fresnel lens array which is off-axis so that a portion of the light won't initially escape from the back light module. The light is reflected down the length of the light guide, spreading the light across the back light module. In one embodiment, the Fresnel lens array is designed to have its efficiency vary across the back light. A smaller percentage of the light is directed out of the module near the light source, with most of the light being directed down the light guide. In an LED embodiment, the LED is mounted on the top or bottom edge of the light guide with a diffraction structure on the opposite side to diffract the light down the light guide.

13 Claims, 16 Drawing Sheets

BACK LIGHT MODULE WITH MICRO FRESNEL LENS

BACKGROUND OF THE INVENTION

The present invention relates to light guides for Liquid Crystal Displays (LCDs), and in particular to the use of a Fresnel lens to redirect light from a light source.

LCD displays are used in televisions, computer monitors, mobile phones and other devices. LCD displays use a back light module to illuminate the LCD display. There are two popular methods for the placement of the light source. For large screens the light source is placed behind the LCD display. For smaller screens the light source is placed on the side of a light guide. The most common light source used in television is CCFL (cold cathode fluorescent lamp), which requires a high voltage source. A more energy efficient light source is the Light Emitting Diode (LED). However, there are obstacles to using LEDs.

One of these obstacles is illustrate in FIG. 1. An array of LEDs 102 is mounted on a printed circuit board (PCB) 101 and is placed behind the LCD screen 103. Due to the divergence angle of the LED light source, the LCD screen 103 must be placed at a distance from the LED in order to have uniform illumination of the LCD screen. This defeats the goal of having a thin display.

One approach to making a thinner display is to use side illumination, as illustrated in FIG. 2. A typical back light module for LCDs used in desktop and laptop computer displays have side illumination as shown in FIG. 1. Side illumination is used rather than having the LEDs behind the screen in order to reduce the thickness of the display. However, the current method of coupling LED light into a light guide is not efficient enough for their use in a large screen television. Thus, fluorescent light (CCFL) is typically used for large screen TVs, while smaller displays, such as mobile phones, can use LEDs.

As shown in FIG. 2, a light source 110 injects light into a light guide (waveguide) structure 112, which is typically a clear slab of plastic or acrylic. Light source 110 can be a cold cathode fluorescent lamp (CCFL) or a light bar with a number of LEDs. Light source 110 can be enclosed by a cylindrical reflector 114 to focus the light into the light guide 112. Due to the higher index of the light guide material, a light ray such as ray 116, which is incident on the top surface of the light guide with an angle larger than the critical angle, is reflected and propagates toward the bottom of the light guide. Light ray 118, which is incident at an angle smaller than the critical angle, will leak out of the light guide. In order to facilitate the coupling of light out of the waveguide, some structures are put on the bottom surface 120 of the light guide.

FIG. 3 shows an example of the structures 201 used on surface 120 of FIG. 1. The circles 202, 203 indicate the locations of highly reflective particles on the bottom surface of the light guide. These particles can be made either of reflective paint or structures such as hemispheres. In order to achieve uniform distribution of the light emitting from the light guide, fewer particles are placed on the side closer to the light source. Otherwise, too much light would be reflected out from the side close to the light source, leaving too little light to propagate to the right and be reflected out the far side of the light guide. The size and density of the circles in FIG. 2 symbolically illustrates a variation of the reflective particles on the bottom surface. Unfortunately, with the light source placed at the side of the light guide, most of the light coupled out from the waveguide propagates almost parallel to the top surface of the light guide. This is highly undesirable, since the viewer is looking in a direction normal to the surface of the light guide.

FIG. 4 illustrates one of the techniques to overcome this difficulty in a structure with a light source 301, cylindrical reflector 302 and reflector 303. A diffuser 304 is put on top of the light guide. Light rays incident on the diffuser are scattered over a larger cone angle 305. Hence there will be more light propagating closer to the normal direction of the light guide. This diffuser also makes the light emerging from the waveguide more uniform. However, even with the diffuser, the light emerging from the light guide is still not quite normal to the display surface.

FIG. 5 shows a structure with two light sources 501, one at each end of the light guide structure, each with its own cylindrical reflector 502. A reflector 503 and diffuser 504 are shown. A prism film 505 is added to the light guide structure. The prism film only allows light rays within certain angles to be passed through. The light rays emerging from the prism film will be within +/−30 degree with respect to the normal of the light guide surface, as shown by light rays within angle 506. As can be seen, such an illumination system is highly light inefficient and expensive in cost due to the multiple layers of film needed to correct for the illumination distribution. In order to provide sufficient illumination, often light sources on the two sides are used as shown, although alternately a light source on a single side can be used, such as for a smaller display.

There are many examples of improvements on this basic back light module. For example, U.S. Pat. No. 5,392,199 and U.S. Pat. No. 5,647,655 show a reflecting plate below a light guide, and a diffusion layer above it. The ends of the cylindrical reflector around the light source are bonded to the light guide. U.S. Pat. No. 5,779,337 shows a light guide with a plurality of projections or grooves arrayed on the light emitting (top) surface to cause more light to be emitted. U.S. Pat. No. 6,115,058 shows an LCD using polarizing filters and a Fresnel lens 201 bonded to the back of the LCD. U.S. Pat. No. 6,710,829 shows a press to generate a plurality of recesses of different sizes on the illuminating plate of a back light plate. U.S. Pat. No. 7,160,018 shows a back light plate with an array of prisms on the front or top, and reflective dots on the bottom surface. U.S. Pat. No. 7,270,466 shows a bottom reflecting surface with different sized and spaced protrusions on the two sides of the reflecting surface.

A number of other patents and published applications discuss the use of a Fresnel lens structure in a backlighting application. Such a lens can be used to disperse light from an LED into a light guide for the backlight. US Published Application No. 2006-0256578 describes a Fresnel structure for reflecting light from an LED into a light guide. This is also shown in U.S. Pat. No. 6,935,764. US2007-041215 shows a Fresnel lens for corners. U.S. Pat. No. 5,579,134 shows a Fresnel lens for a top surface. US2002093742 shows a microfresnel lens array on top of a light guide, with an array of reflective protrusions below, with the protrusions reflecting light from the side to the microfresnel lens array on axis (straight on). U.S. Pat. No. 6,935,764 shows a Fresnel lens for dispersing the LED light where it enters the light guide. U.S. Pat. No. 6,883,934 shows a Fresnel lens over the LED. U.S. Pat. No. 5,851,062 and U.S. Pat. No. 7,018,088 show a prism above (in front of) the LCD. U.S. Pat. No. 7,226,196 shows deformities on the top and bottom layers of a light guide.

U.S. Pat. No. 6,196,691 describes a single, ruled diffraction structure on the bottom of the light guide to couple light out. The diffractive structure has a constant period.

It is an objective of this invention to provide an efficient way to couple light into a light guide for use in large screen television. This same method can also be used in small screen displays such as the ones used in mobile phones or other personal devices. It is also an objective to remove the need for the multiple layers, with their added expense and size, such as the prism and diffuser layers.

BRIEF SUMMARY OF THE INVENTION

This invention discloses a back light module where one of the top and bottom surfaces of the light guide contain a micro Fresnel lens array. The Fresnel lens array is off-axis compared to the light which impinges on it from an angle, designed to reflect the light at an angle such that a portion of the light won't escape from the back light module. The back light module thus acts as a light guide, reflecting the light down its length, thereby spreading the light across the entire length of the back light module. The Fresnel lens array is designed so that a portion of the light escapes by diffraction, and at least 50% of the light propagates down the light guide. Because the light escape by diffraction is nearly normal to the LCD surface, the Fresnel lens thus eliminates the need for the prism 505 as shown in FIG. 5, and in one embodiment the Fresnel lens is patterned to also diffuse the light, thus also eliminating the need for a diffuser layer 504. Thus, as opposed to the prior art which uses Fresnel lens arrays to spread light emitted from a light guide, the present invention uses a Fresnel lens array to direct light down the light guide and to couple light out of the light guide.

In one embodiment, the Fresnel lens array is designed to have its efficiency vary across the back light. A smaller percentage of the light is directed out of the module near the light source, with most of the light being directed down the light guide. As the end of the backlight module is approached, there is less light available since a portion of the light has been directed outward. At this point, a greater portion of the light is directed outward, and a lesser portion continues to propagate down the light guide.

In one embodiment, the Fresnel lens array is on a bottom, reflective surface of the light guide. Alternately, a simple reflective surface is used on the bottom, with a transparent Fresnel lens array on the top of the light guide.

In one embodiment, the Fresnel lens array is regular, with a constant period. But individual structures in the array have different grating periods. For a micro Fresnel lens array, there may be millions of such structures. In one embodiment, different color LEDs could be used, with each of the structures being designed for one of the colors. Thus, a mix of colors, producing the desired white light, is provided.

In one embodiment, the Fresnel lens array is put on a film or molded into the light guide as part of the injection molding process in forming the light guide. The bottom Fresnel lens array is metalized to be highly reflective. The density or the light efficiency of the micro Fresnel lens on the bottom or the top surface of the light guide can be adjusted so that the light emerging from the light guide will be uniform.

In one embodiment, for an LED device, instead of the LED being on the side, it is on the top or bottom surface of an edge of the light guide. Once the LED light is injected into the light guide, a diffractive device will diffract the incoming light, at an angle larger than the critical angle of the light guide, so that it propagates down the light guide. The diffracted light will propagate down the light guide until it is incident on another diffractive device. Then a portion of the propagating light will couple out of the light guide to illuminate the LCD display.

DETAILED DESCRIPTION OF THE INVENTION

Creation of Micro Fresnel Lens Structure

FIG. 6 illustrates how a Fresnel lens [Wai-Hon Lee, "Computer-generated holograms: techniques and applications", in Progress in Optics, volume XVI, edited by E. Wolf, published by North Holland Publishing Co., (1978)] is produced by the interference of a point source and a collimated laser beam. Assume that the recording material is lying on the x-y plane and a point source is located at a distance (X,0,Z) from the center of the recording plane. The interference pattern between the point source and a collimated beam normal to the recording plane can be approximately given by $$I(x, y) = \left| 1 + \exp\left(\frac{j\pi}{2F}\{x^2 + y^2 - 2Xx\}\right) \right|^2 \quad (2)$$

where X=F sin ω is the distance between the point source and the center of the recording plane and ω is the angle between the principle ray of the point source and the reference beam.

After mathematical simplification, I(x, y) is proportional to $$\left(1 + \cos\left(\frac{\pi[x^2 + y^2]}{\lambda F} - \frac{2\pi}{\lambda}\sin \omega x\right)\right).$$

The structure I(x, y) has two phase components. The component $$\frac{2\pi}{\lambda}$$

sin ωx will diffract the LED light so that it can be guided by the light guide. The second component $$\frac{\pi}{\lambda F}(x^2 + y^2)$$

will spread the light so that light of different wavelength will not be separated during its propagation down the waveguide.

Different Micro Fresnel Lens Structures

Figure 1:
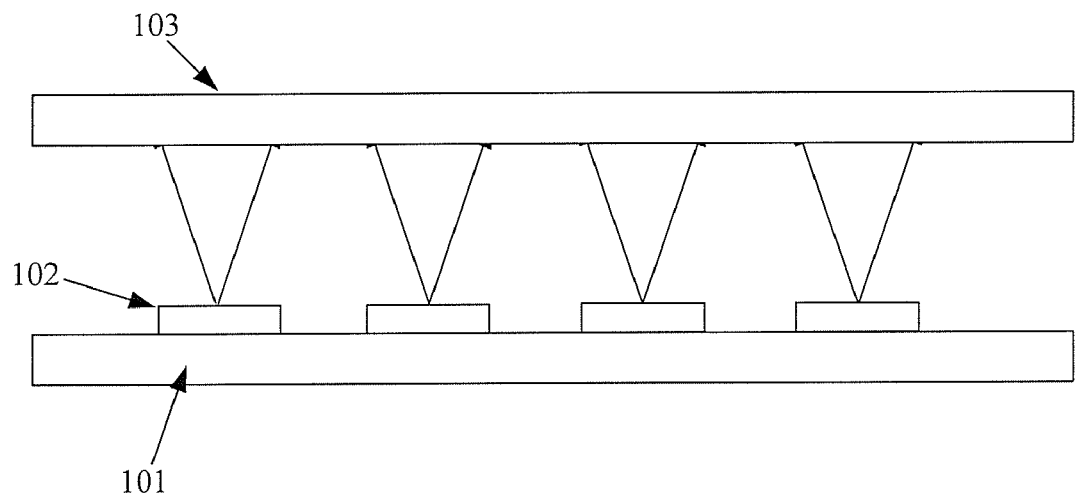
FIG. 1 illustrates a prior art light guide with LEDs on the bottom.
Figure 2:
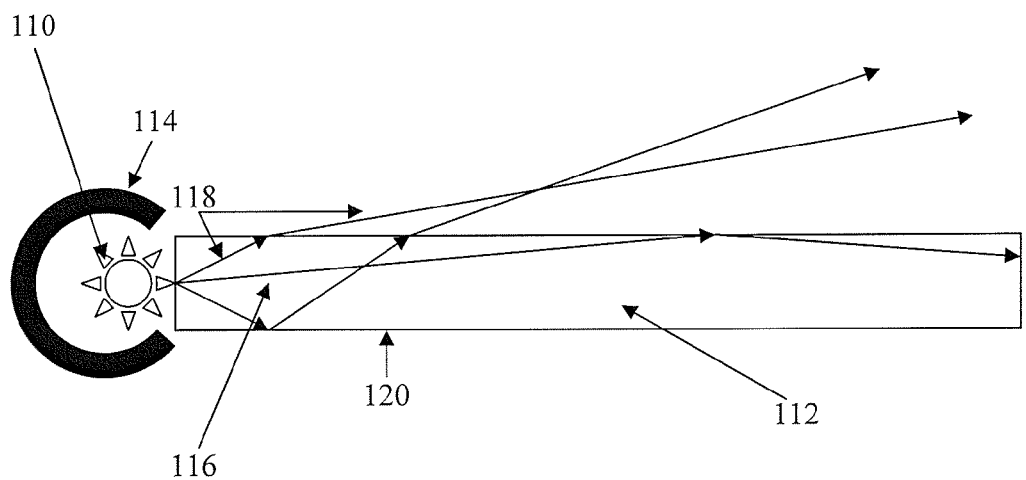
FIG. 2 illustrates a prior art light guide with a light source on the side.
Figure 3:
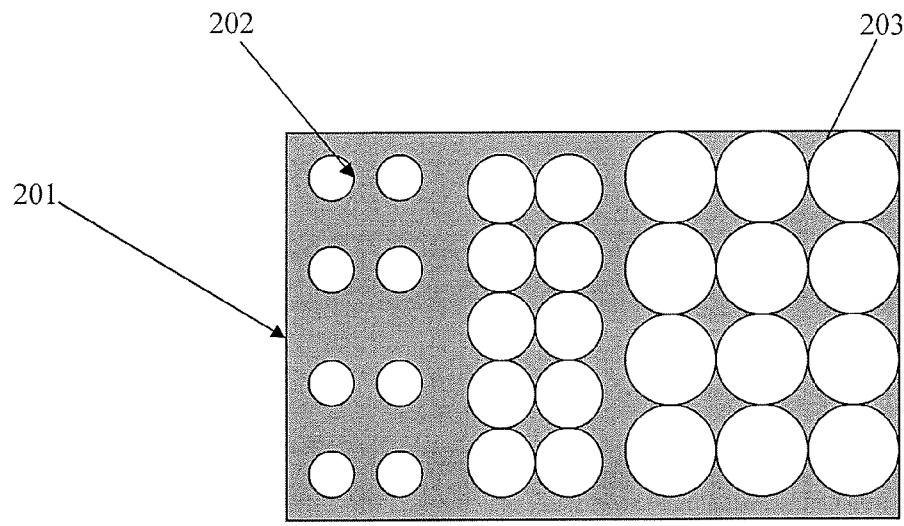
FIG. 3 illustrates a pattern on a prior art light guide.
Figure 4:
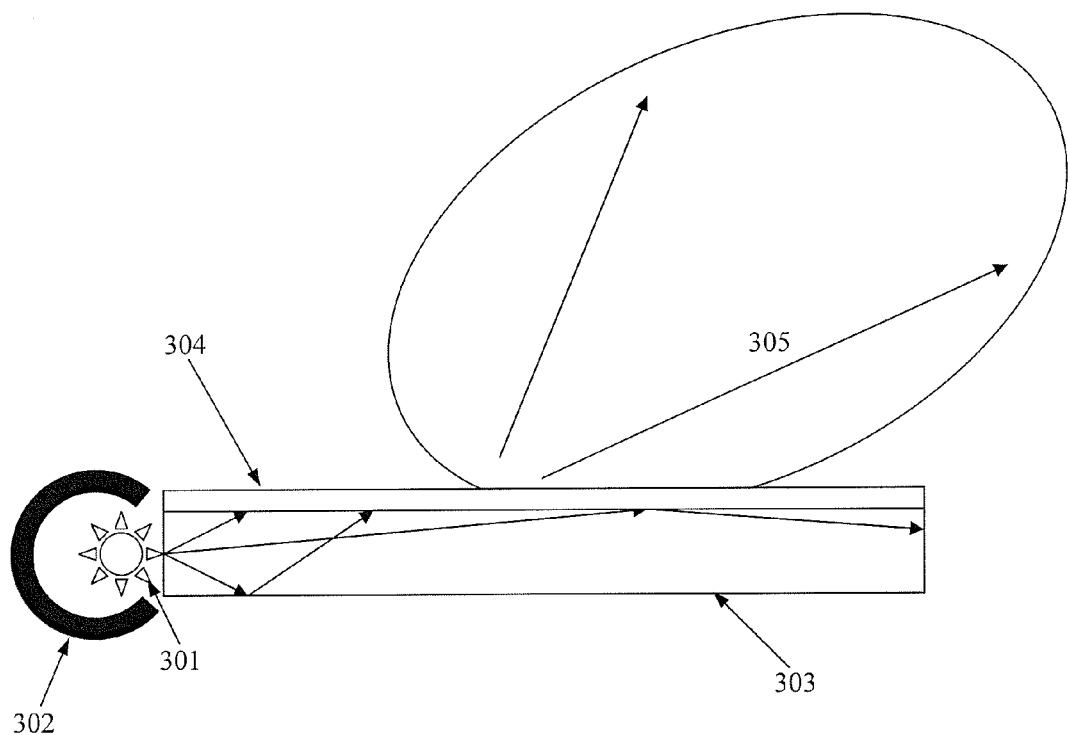
FIG. 4. illustrates a prior art back light with a diffuser on top surface.
Figure 5:
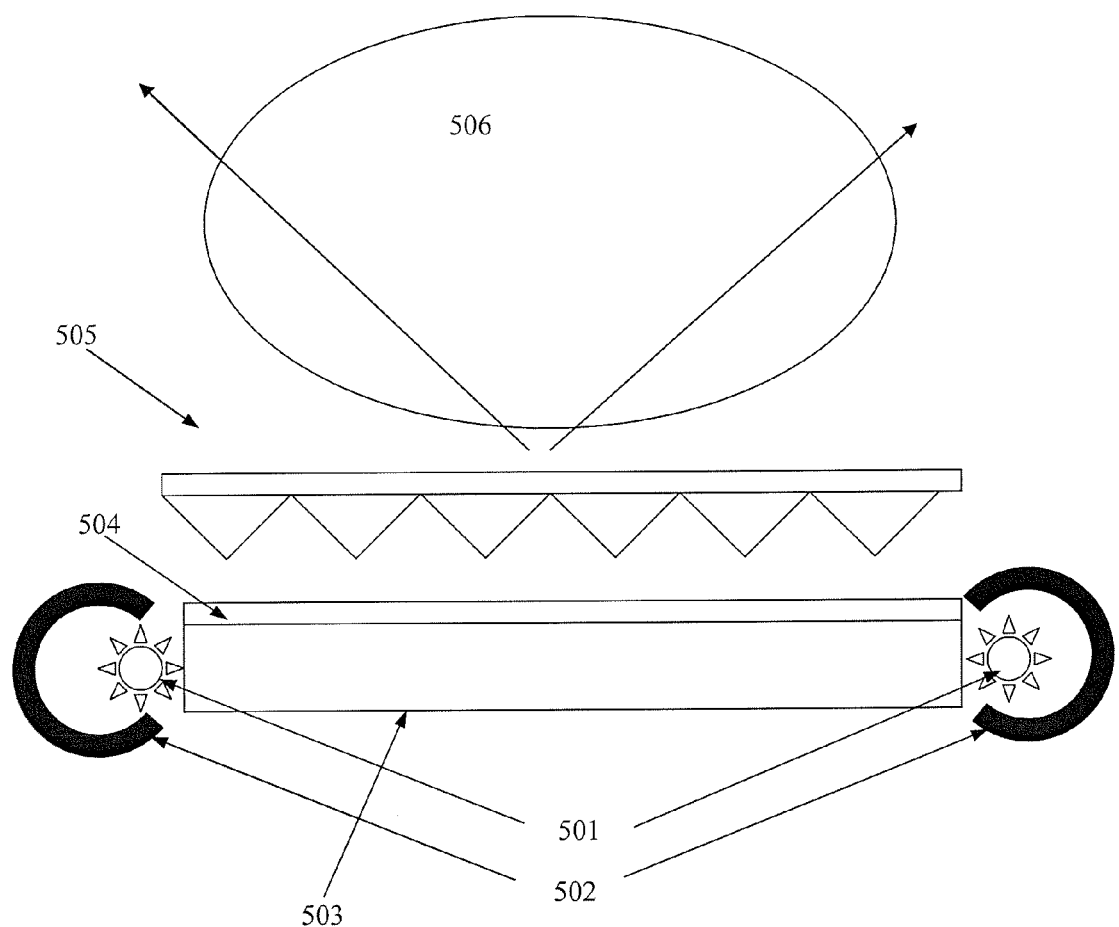
FIG. 5. illustrates a prior art back light with a diffuser, a prism film and two light sources.
Figure 6A:
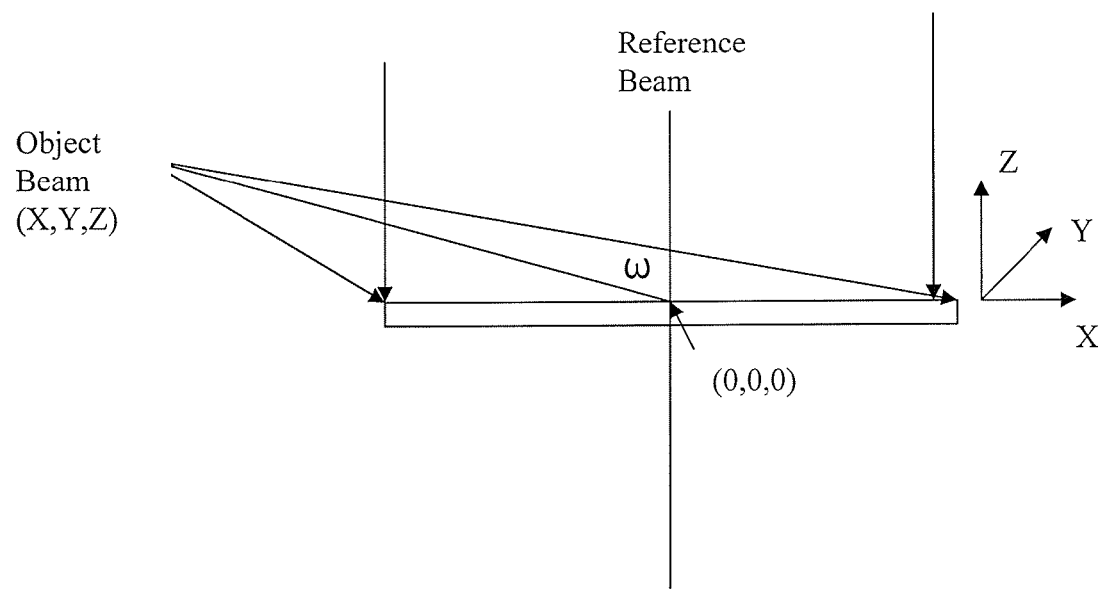
FIG. 6a illustrates the formation of micro-Fresnel lens according to an embodiment of the present invention.
Figure 6B:
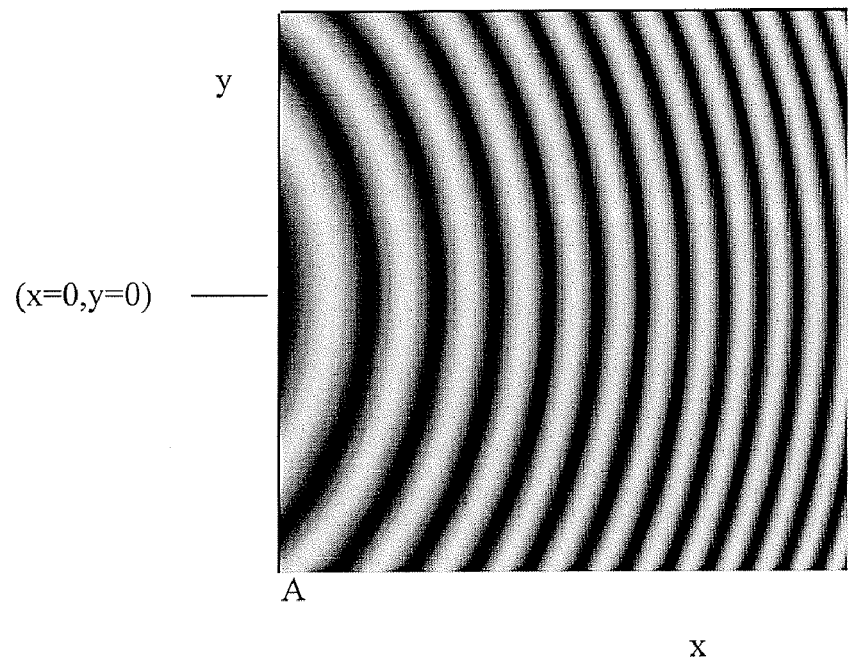
FIGS. 6b-e illustrate different microstructures of the micro-Fresnel lens according to an embodiment of the present invention.

An example of such a Fresnel lens structure is shown in FIG. 6(b). After this interference is recorded and the recording plate is placed back in the same position as in FIG. 6(a), the point source will reconstruct a parallel beam propagating normal to the recording plane. This property of the Fresnel lens allows the light injected into the light guide from the side of the waveguide, such as the point source in FIG. 6(a), to exit the light normal to the light guide surface.

Figure 6C:
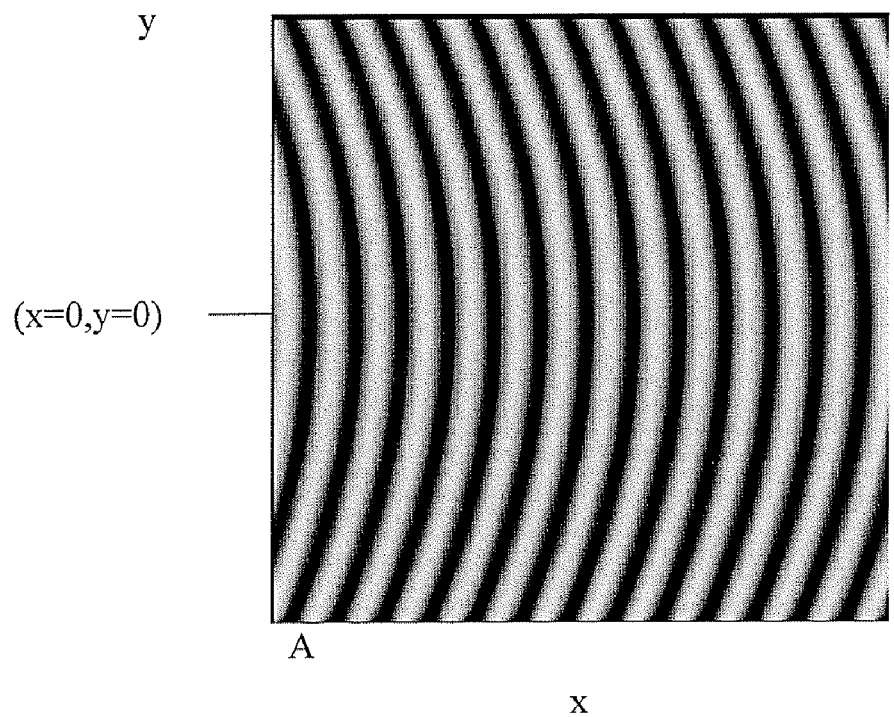

If the point source in FIG. 6(a) is replaced by a line source, the intensity of the interference pattern will be proportional to $$\left(1 + \cos\left(\frac{\pi x^2}{\lambda F} - \frac{2\pi}{\lambda}\sin\omega x\right)\right)$$

and has a structure as shown in FIG. 6c.

Figure 6D:
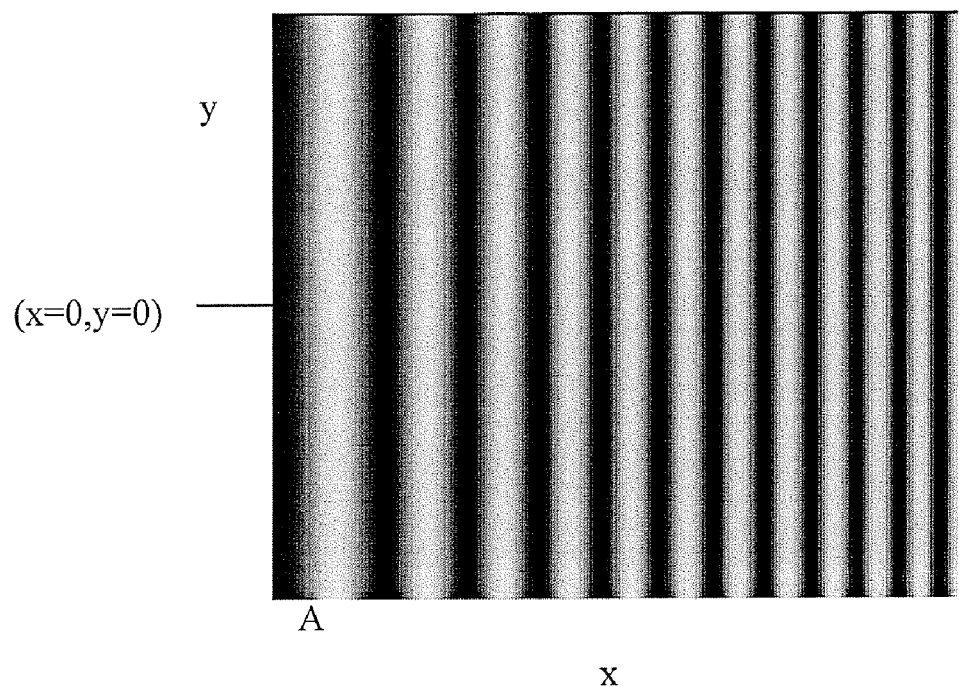

Another variation of the Fresnel lens structure is shown in FIG. 6d where the interference pattern is given by $$\left(1 + \cos\left(\frac{\pi y^2}{\lambda F} - \frac{2\pi}{\lambda}\sin\omega x\right)\right).$$

Figure 6E:
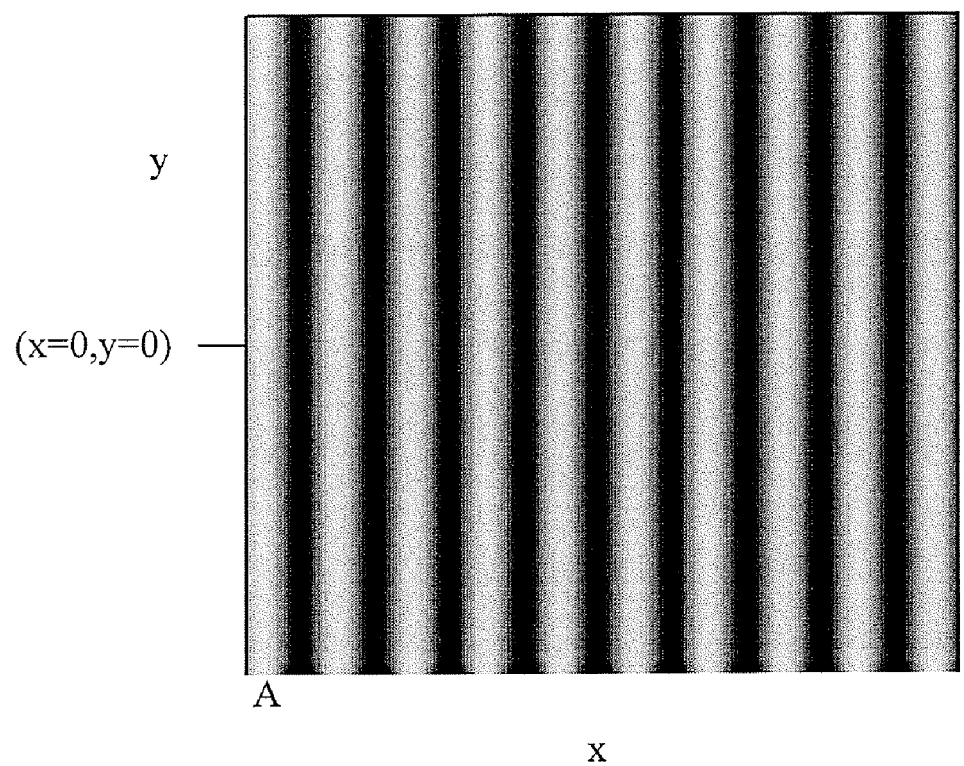
Figure 6F:
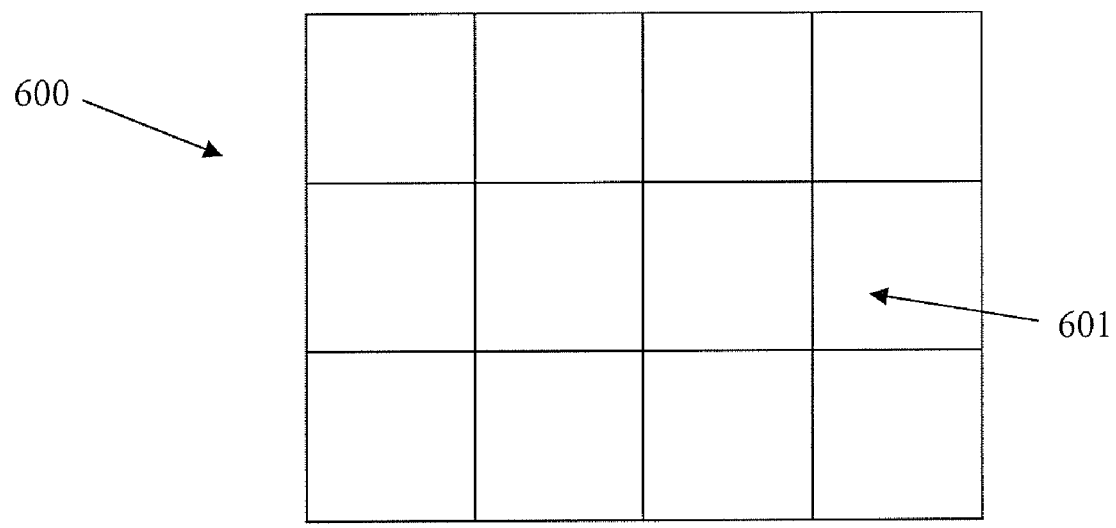
FIG. 6f illustrates a Fresnel lens array according to an embodiment of the present invention.

When the dimension of the micro-Fresnel lens is small relative to F, the intensity pattern of the micro-Fresnel lens can further be simplified to $$\left(1 + \cos\left(\frac{2\pi}{\lambda}\sin\omega x\right)\right)$$

as shown in FIG. 6(e).

It is possible to record these micro-Fresnel lenses in a recording material by interference of laser beams as shown in FIG. 6a. Or the pattern can be generated by a computer graphic according to Eq. (2), and use a step and repeat camera to form the lens array on a photographic material. The parameters F and ω are selected according to the geometry of the light guide. For a typical light guide material ω is about 38 degrees, which is the critical angle for total internal reflection. The parameter F is selected to disperse the light within a 15 degree cone angle.

The Fresnel lens structure is a series of small ridges, a 3 dimensional surface relief pattern. In one embodiment, each Fresnel lens is a square with 50 microns sides. To manufacture the Fresnel lens structure on a film, the pattern I(x, y) is used to expose a glass plate coated with photo resist. The same pattern can be stepped across the whole glass plate. After exposure to the light pattern, the glass plate with photo resist is immersed in a development solution. The portion of the photo resist exposed to light will be removed by the developer. Thus, the ridges are formed with the Fresnel structure. Then a metal shim of the photo resist ridges is made by an electroforming process. The metal shim is used to emboss the Fresnel structure on a film which is then laminated onto the light guide. In one embodiment, for a large display, the light guide is a 2-3 mm thick piece of plastic to provide a rigid surface. Smaller displays can use thinner light guides, such as 0.25-0.4 mm for a mobile phone display.

Alternately, the light guide itself can be etched to provide the Fresnel lens patterns. The etched surface is then metalized. For example, an embossing technique could be used, followed by metallization. Alternately, an injection mold could be used with a mold form having the desired Fresnel lens structures on it.

Light Guide with Micro Fresnel Lens Array and Slanted Entry

Figure 7:
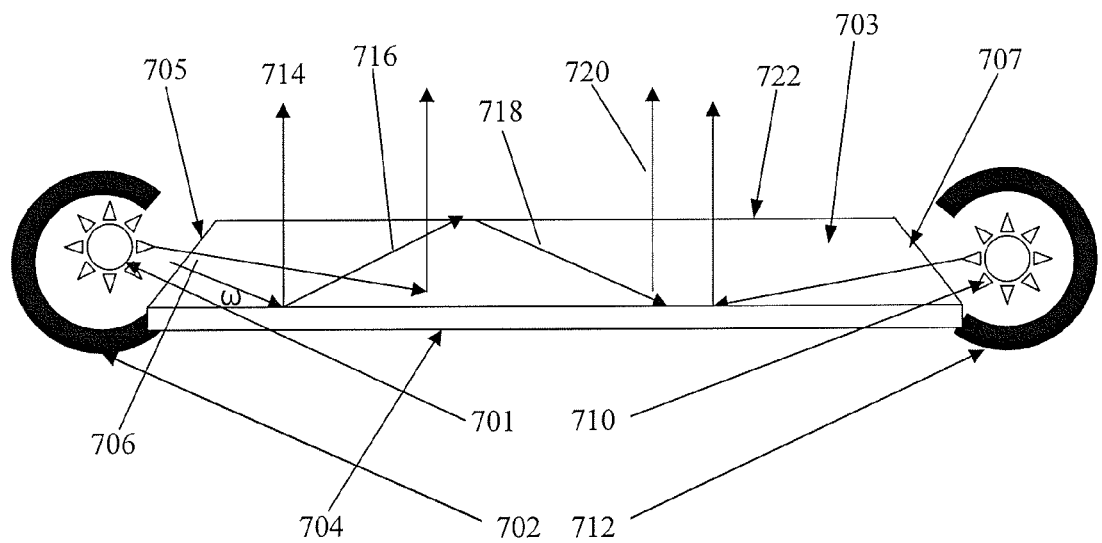
FIG. 7 illustrates an embodiment of a back light of present invention with a slanted surface for coupling in light and using one or two light sources.

FIG. 7 illustrates an embodiment of a back light of the present invention with one of the Fresnel lens patterns of FIGS. 6b-e on a bottom surface 704. This embodiment also adds slanted surfaces 705, 707 to couple light into the light guide at an optimum angle. A line light source 701 with a back reflector 702 is used to project light into light guide 703 which has a slanted surface 705 facing the light source 701. In one embodiment, a second light source 710 with a back reflector 712 is used to project light into the other side through slanted end 707 for big displays. Although light sources are shown on both sides, alternately a light source on only a single side could be used, such as for a small display. In the single light source version, the wall of the light guide opposite the light source would be straight and reflective, not slanted. A practical angle for injecting light into the light guide can be 45 degree. The light from the light source is refracted to incident on the bottom surface with an angle larger than the critical angle of the light guide.

The central ray 706 of the light source, after being refracted by surface 705, is incident on the bottom surface of the light guide with angle ω. When the angle ω exceeds the critical angle, the central ray of the light source will be reflected by the top and bottom surface of the light guide. As a result, light from the light source is confined by the light guide and propagates through the light guide towards the opposite side 707. For a single light source, the other side 707 would be straight, not slanted, and has a reflective coating which recycles light back towards the light source. As the light propagates down the light guide, the light will diverge with distance from the light source. However, the angle that the central ray incident on the light guide surfaces will be the same.

When ray 706 contacts the Fresnel lens pattern on surface 704, part of the light 714 is emitted, while most of the light 716 is directed down the light guide. Light 716 reflects off the top of the light guide, and again contacts the micro Fresnel lens pattern on surface 704, where a portion 720 is emitted. As described above, as the light progresses, a larger amount of the steady diminishing light is emitted.

Figure 8:
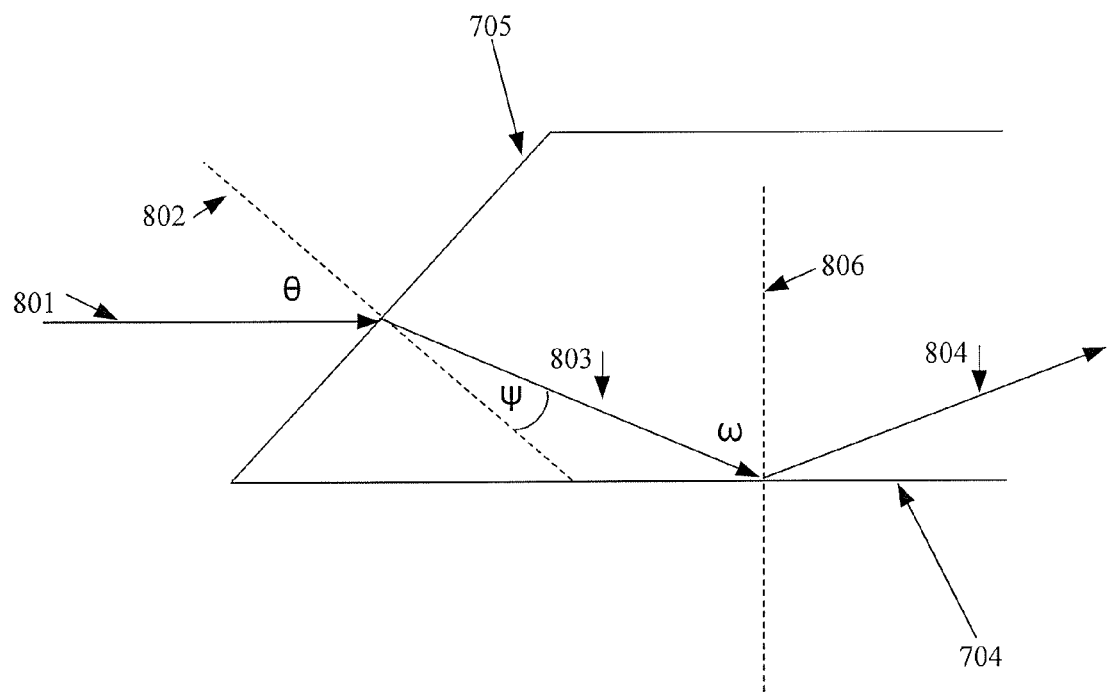
FIG. 8 further illustrates how light is coupled into the light guide of FIG. 7 through the slanted surface.

FIG. 8 further illustrates how light is coupled into the light guide through the slanted surface 705. The central ray 801 of the light source is incident on surface 705 with angle θ with respect to the normal 802 of surface 705. The angle ψ of the refracted ray 803 with respect to the normal is given by the relationship sin θ=n sin φ where n is the refractive index of the light guide. The angle ω of the refracted light ray with respect to the normal 806 of the bottom surface of the light guide can be shown to equal to 90+ψ−θ. For θ=45 degrees and n=1.5, the angle ω is 73 degrees. The angle ω is then used in Eq. (2) to calculate the interference pattern for the construction of the micro Fresnel lens. When a reflective film 704 with a micro-Fresnel lens is laminated to the bottom of the light guide, the light ray incident on the bottom surface of the light guide is diffracted by the micro-Fresnel lens and exits the light guide normal to the surface of the light guide on line 806. The undiffracted light 804 will be reflected to the top surface of the light guide and propagate down the light guide.

The micro-lens array is fabricated in a manner that the micro-Fresnel lenses could have a lower density, or be less light efficient in diffraction, when they are closer to the light source. They become more efficient or denser when they are away from the light source. A less efficient lens basically means that the ridges are shallower. In constructing the micro Fresnel lens, the focal length F is adjusted according to its distance from the light source to achieve a collimated beam. The light source used in an LCD display is a white light source (i.e. it contains three primary wavelengths having red, green and blue colors). The micro-lens array contains individual lens designed for each of the three primary wavelengths.

Returning to FIG. 7, in an alternate embodiment a transmissive micro Fresnel lens array is placed on top surface 722 of the light guide, with bottom surface 704 being a reflective surface. The light rays from the light source will be diffracted by the transmissive micro-Fresnel lens and exit the light guide normal to the surface of the light guide. The undiffracted light will either be reflected back into the light guide or leak out from the light guide. The micro-lenses in the array are fabricated in a manner such that the micro-Fresnel lenses have a lower density or is less light efficient in diffraction when they are closer to the light source. They become more efficient or denser when they are away from the light source. Alternately, both a transmissive micro Fresnel lens array 722 on the top, and a reflective micro Fresnel lens array on bottom surface 704 could be used.

In alternate embodiments, the slanted light entry edge could be a series of slanted segments at different angles, or could be a curved surface. The segments or curves could optimize the entry angle of light rays striking at those positions.

Light Source on Top or Bottom Edge

Figure 9:
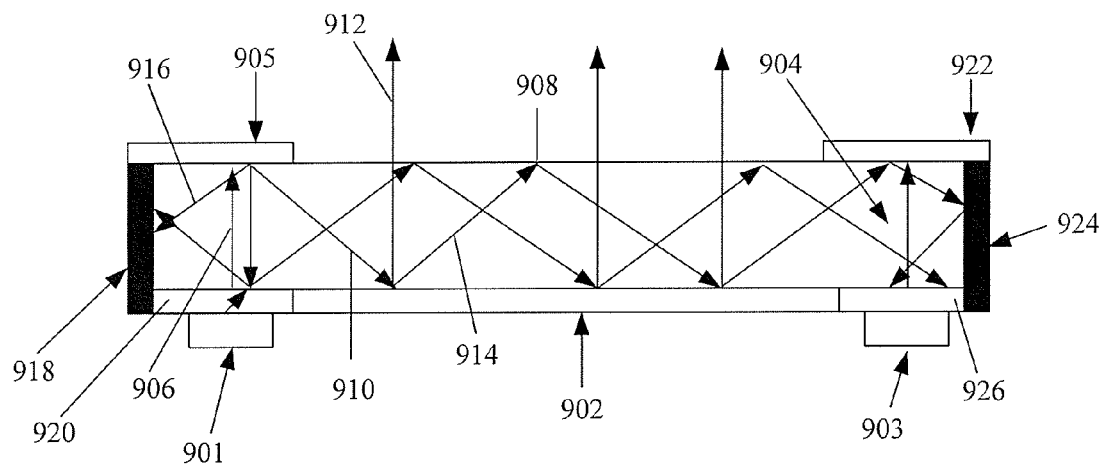
FIG. 9 illustrates an LED source on the bottom edge of a light guide according to an embodiment of the invention.

FIG. 9 shows an alternate embodiment with light sources 901 and 903 mounted on the left and right bottom edges of a light guide 904. Alternately, a single light source can be used. In one embodiment, the light source is an LED or multiple LEDs. Emitted light ray 906 from light source 901 will strike a diffractive (metalized) film 905 mounted on the top layer 908 of the light guide. First order and higher diffracted rays, such as ray 910, are diffracted into the light guide. These rays then impact a micro Fresnel lens array on the bottom surface 502 as described above, with a portion of the light 912 being emitted from the light guide, and a portion 914 propagating down the light guide, where more and more of the light is emitted as it bounces off the surfaces, as described above. The micro-Fresnel structure is designed so that its diffraction efficiency is less strong when it is close to the light source and has higher diffraction efficiency as it is further away from the light source.

The diffractive film will also diffract in the direction of a ray 916, which is reflected off a reflective (metalized) wall 918, and is directed downward to another diffractive (metalized) film 920 on bottom surface 902. Diffractive film 920 will again diffract light down the light guide, with a portion being diffracted back toward reflective wall 918 or top diffractive film 905. The reflections continue until most or all of the light is directed down the light guide.

A similar effect occurs on the other end of the light guide for embodiments with two light sources, with light from light source 903 contacting diffractive film 922, reflective wall 924 and diffractive film 926. The various combinations of micro Fresnel lens arrays described above can be used, and top surface 908 can have a transmissive micro Fresnel lens array in one embodiment, as described above. The micro Fresnel lenses can be optimized for the expected first angle from reflected ray 910.

Figure 10:
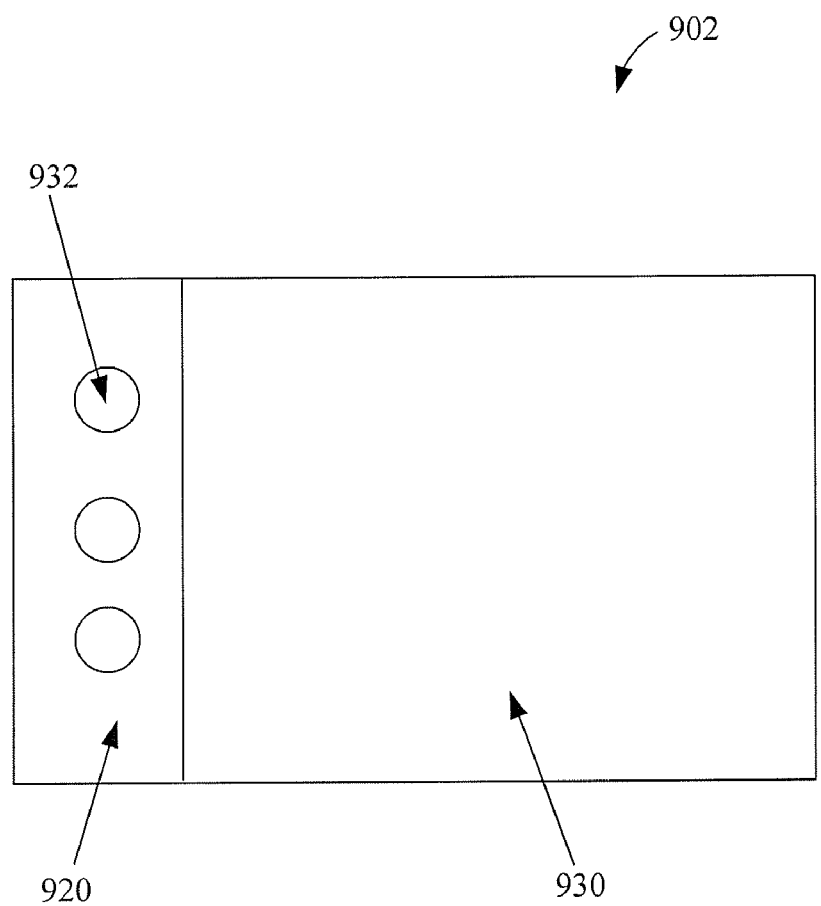
FIG. 10 illustrates a laminated bottom layer with a diffraction and Fresnel lens structure, and including holes for the LEDs of FIG. 9 according to an embodiment of the present invention.

FIG. 10 shows the bottom surface 902 of the light guide of FIG. 9 for the embodiment with only the light sources on the left side. The bottom surface is laminated with a metalized film having the micro Fresnel lens structure in an area 930, and a diffractive film 920. A number of small holes such as 932 are made where the LEDs will be mounted, to allow the LED light to enter into the light guide.

In one embodiment, three LEDs are used, red, blue and green. In one embodiment, the LEDs are time sequenced so that the color filter normally applied to the LCD display can be remove. In one embodiment, additional LEDs can be used, such as two blue LEDs or two red LEDs to get the right mix for white color. The micro Fresnel lens array will have individual lens optimized for each of red, green and blue, as described above. In addition, a diffusion capability can be built into the micro Fresnel lens and optionally the diffractive films at the edges. The LED back light module will thus produce a uniformly white illumination for the LCD panel on top of the light guide.

Figure 11:
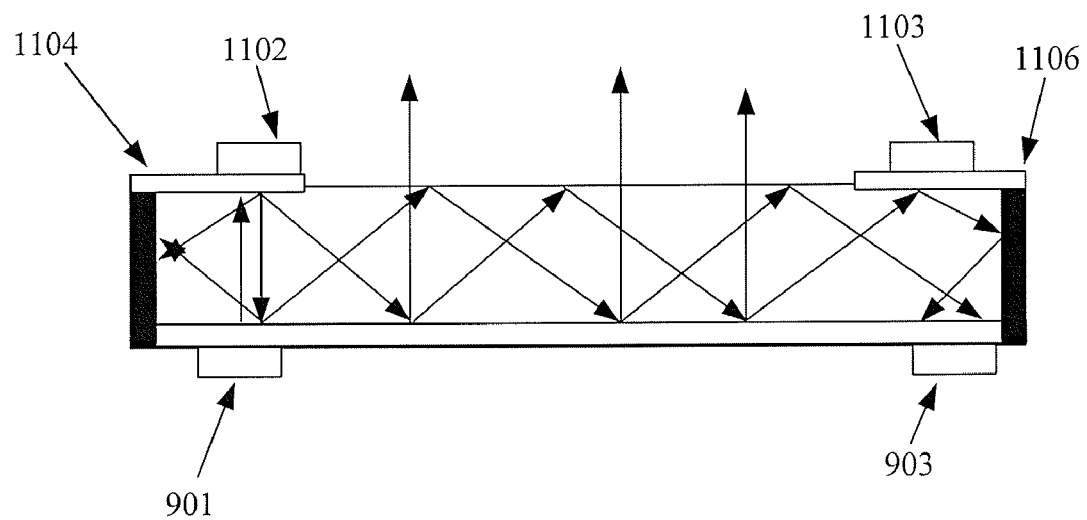
FIG. 11 illustrates the embodiment of FIG. 9 with an additional LED source on the top edge of a light guide according to an embodiment of the invention.

FIG. 11 shows a LED back light module with LEDs placed on the top and bottom surface of the light guide. The additional LEDs 1102 and 1103 will require holes in diffractive films and 1106.

It is to be understood that the examples and embodiments described above are for illustrative purposes only and that various modifications or changes in light thereof will be suggested to persons skilled in the art and are to be included within the purview of this application and scope of the appended claims. For example, the light source could be mounted at an angle to the end of the light source. A diffuser and/or a lens could be added where the light from the light source enters the light guide. Different colors, numbers or arrangements of LEDs could be used. Different light sources could be used. Other structures than a Fresnel lens could be used. Blue LEDs could be used, with a phosphorus structure on top of the light guide emitting light when struck by the blue light. Therefore, the above description should not be understood as limiting the scope of the invention as defined by the claims.

What is claimed is:

1. A back light structure comprising:
   a transparent light guide;
   a light source mounted to direct light into said light guide; and
   a micro-Fresnel lens array on a surface of said light guide, said micro-Fresnel lens array being shaped to reflect light at an angle such that a portion of the light won't escape from the back light module on a first reflection, and will propagate down said light guide;
   wherein the micro-Fresnel lenses in the array have a spatial variation described by a function proportional to $$\left(1+\cos\left(\frac{\pi(x^2+y^2)}{\lambda F}-\frac{2\pi}{\lambda}\sin\omega x\right)\right),$$

where parameters ω is larger than the critical angle of the light guide, F is selected to disperse light over an angle less than +/−45 degree and x,y are the spatial coordinates of the Fresnel structure.

2. The back light structure of claim 1 wherein the efficiency of said micro-Fresnel lens array varies across said light guide.

3. The back light structure of claim 2 wherein micro Fresnel lenses in said array vary in structure such that a first plurality of lenses near the light source direct a smaller percentage of the light out of the module than a second plurality of lenses farther from the light source than said first plurality of lenses.

4. The back light structure of claim 1 wherein said micro-Fresnel lens array is patterned to also diffuse the light, eliminating the need for a separate diffuser in said structure.

5. The back light structure of claim 1 wherein said micro-Fresnel lens array is a reflective structure on a bottom surface of said light guide.

6. The back light structure of claim 1 further comprising:
a reflective surface on the bottom of said light guide; and
said micro-Fresnel lens array is a transmissive structure on a top surface of the light guide.

7. The back light structure of claim 1 further comprising:
said light source including a plurality of different color LEDs; and
a plurality of individual lenses in said micro-Fresnel lens array are designed for one of the colors.

8. The back light structure of claim 1 wherein the transparent light guide is molded clear plastic with all the side surfaces being coated with a metal layer except at least a portion of the surface where light is injected into the light guide.

9. The back light structure of claim 1 wherein said micro-Fresnel lens array is formed on a film which is laminated to said light guide.

10. The back light structure of claim 1 wherein said micro-Fresnel lens array is part of a surface of the light guide.

11. A back light structure comprising:
a transparent light guide;
a light source mounted to direct light into said light guide; and
a micro-Fresnel lens array on a surface of said light guide, said micro-Fresnel lens array being shaped to reflect light at an angle such that a portion of the light won't escape from the back light module on a first reflection, and will propagate down said light guide;
said light source including a plurality of different color LEDs; and
a plurality of individual lenses in said micro-Fresnel lens array are designed for one of the colors;
wherein the micro-Fresnel lens in the array has a spatial variation described by a function proportional to $$\left(1+\cos\left(\frac{\pi x^2}{\lambda F}-\frac{2\pi}{\lambda}\sin\omega x\right)\right),$$

where parameters ω is larger than the critical angle of the light guide, F is selected to disperse light over an angle less than +/−45 degree and x,y are the spatial coordinates of the Fresnel structure.

12. A back light structure comprising:
a transparent light guide;
a light source mounted to direct light into said light guide; and
a micro-Fresnel lens array on a surface of said light guide, said micro-Fresnel lens array being shaped to reflect light at an angle such that a portion of the light won't escape from the back light module on a first reflection, and will propagate down said light guide;
said light source including a plurality of different color LEDs; and
a plurality of individual lenses in said micro-Fresnel lens array are designed for one of the colors;
wherein the micro-Fresnel lens in the array has a spatial variation described by a function proportional to $$\left(1+\cos\left(\frac{\pi y^2}{\lambda F}-\frac{2\pi}{\lambda}\sin\omega x\right)\right),$$

where parameter ω is larger than the critical angle of the light guide, F is selected to disperse light over an angle less than +/−45 degree and x,y are the spatial coordinates of the Fresnel structure.

13. A back light structure comprising:
a transparent light guide;
a light source mounted to direct light into said light guide; and
a micro-Fresnel lens array on a surface of said light guide, said micro-Fresnel lens array being shaped to reflect light at an angle such that a portion of the light won't escape from the back light module on a first reflection, and will propagate down said light guide;
wherein the micro-Fresnel lens in the array has a spatial variation described by a function proportional to (1+cos (2π/λ sin ωx)), where parameters ω is larger than the critical angle of the light guide, and x,y are the spatial coordinates of the Fresnel structure.

* * * * *